United States Patent
Yang et al.

(10) Patent No.: US 11,135,829 B2
(45) Date of Patent: Oct. 5, 2021

(54) SYSTEM AND METHOD FOR MAKING PIN REINFORCED SANDWICH PANEL AND RESULTING PANEL STRUCTURE

(71) Applicant: THE BOEING COMPANY, Chicago, IL (US)

(72) Inventors: Sophia Yang, Lynnwood, WA (US); Matthew H. Cawthorne, Wayne, PA (US); Edward W. Brouwers, Havertown, PA (US); Jacob Michael Hundley, Thousand Oaks, CA (US); Zak Charles Eckel, Malibu, CA (US); Scott Biesboer, Santa Monica, CA (US); Kenneth Cante, St. La Puente, CA (US)

(73) Assignee: THE BOEING COMPANY, Chicago, IL (US)

( * ) Notice: Subject to any disclaimer, the term of this patent is extended or adjusted under 35 U.S.C. 154(b) by 13 days.

(21) Appl. No.: 15/282,204

(22) Filed: Sep. 30, 2016

(65) Prior Publication Data
US 2018/0093428 A1 Apr. 5, 2018

(51) Int. Cl.
*B29C 67/00* (2017.01)
*B33Y 30/00* (2015.01)
(Continued)

(52) U.S. Cl.
CPC .......... *B33Y 30/00* (2014.12); *B29C 35/0266* (2013.01); *B29C 35/0805* (2013.01); *B29C 35/0894* (2013.01); *B29C 64/135* (2017.08); *B29C 64/268* (2017.08); *B29C 70/747* (2013.01); *B32B 5/24* (2013.01);
(Continued)

(58) Field of Classification Search
CPC ............. B29C 67/004; B29C 35/0894; B29C 35/0805; B29C 35/0266; B29C 2035/0827; B29C 64/268; B29C 64/135; B32B 37/0084; B32B 3/266; B32B 3/12;
(Continued)

(56) References Cited

U.S. PATENT DOCUMENTS 5,876,652 A 3/1999 Rorabaugh et al.
6,151,859 A * 11/2000 Nowacek ................. C08J 11/06
52/518

(Continued)

FOREIGN PATENT DOCUMENTS

WO WO-2015073098 A2 5/2015

OTHER PUBLICATIONS

WO 2015/073098, May 21, 2015 (Year: 2015).*

(Continued)

*Primary Examiner* — Donald J Loney
(74) *Attorney, Agent, or Firm* — Marshall, Gerstein & Borun LLP (57) ABSTRACT

A system for forming a structural member which includes a first collimated light source and a reservoir containing a volume of photo-monomer resin wherein the first collimated light source is positioned spaced apart from the photo-monomer resin. The system further includes a first face sheet structure defining at least one bore which extends through the first face sheet structure wherein a portion of the first face sheet structure is positioned under a surface of the volume of photo-monomer resin such that photo-monomer resin is positioned within the bore.

20 Claims, 4 Drawing Sheets

(51) Int. Cl.
  *B29C 35/08* (2006.01)
  *B32B 5/24* (2006.01)
  *B32B 37/14* (2006.01)
  *B29C 64/135* (2017.01)
  *B32B 37/00* (2006.01)
  *B32B 37/24* (2006.01)
  *B29C 35/02* (2006.01)
  *B33Y 10/00* (2015.01)
  *B29C 64/268* (2017.01)
  *B33Y 80/00* (2015.01)
  *B29C 70/74* (2006.01)
  *B32B 38/00* (2006.01)
  *B32B 38/04* (2006.01)
  *B29K 105/00* (2006.01)

(52) U.S. Cl.
  CPC ........ *B32B 37/0084* (2013.01); *B32B 37/144* (2013.01); *B32B 37/24* (2013.01); *B33Y 10/00* (2014.12); *B33Y 80/00* (2014.12); *B29C 2035/0827* (2013.01); *B29K 2105/0002* (2013.01); *B29K 2995/0027* (2013.01); *B32B 2038/0076* (2013.01); *B32B 2038/047* (2013.01); *B32B 2250/40* (2013.01); *B32B 2307/41* (2013.01); *B32B 2307/412* (2013.01); *B32B 2310/0831* (2013.01); *B32B 2605/18* (2013.01)

(58) Field of Classification Search
  CPC .... B32B 3/20; B32B 3/08; B32B 3/10; B33Y 80/00; B33Y 30/00; Y10T 428/24661
  See application file for complete search history.

(56) References Cited

U.S. PATENT DOCUMENTS

| | | | |
|---|---|---|---|
| 6,291,049 B1 | 9/2001 | Kunkel et al. | |
| 7,382,959 B1 | 6/2008 | Jacobsen | |
| 7,424,967 B2 | 9/2008 | Ervin et al. | |
| 7,857,552 B2 * | 12/2010 | Li | E02D 29/025 405/284 |
| 8,114,544 B1 * | 2/2012 | Salguero | H01M 8/16 429/231.8 |
| 9,162,416 B1 * | 10/2015 | Eckel | B32B 3/12 |
| 2006/0080835 A1 | 4/2006 | Kooistra et al. | |
| 2012/0151868 A1 | 6/2012 | Kang et al. | |
| 2013/0143060 A1 * | 6/2013 | Jacobsen | B29C 71/02 428/594 |
| 2013/0273347 A1 | 10/2013 | Jacobsen et al. | |
| 2014/0037873 A1 | 2/2014 | Cheung et al. | |
| 2014/0140647 A1 * | 5/2014 | Saxton | F16C 33/121 384/276 |
| 2014/0272275 A1 * | 9/2014 | Yang | G02B 6/138 428/116 |
| 2016/0089817 A1 | 3/2016 | Hundley et al. | |
| 2016/0107290 A1 * | 4/2016 | Bajaj | B29C 64/112 451/527 |
| 2016/0208476 A1 * | 7/2016 | Wadley | C23C 8/22 |

OTHER PUBLICATIONS

Extended European Search Report for EP Application No. 17177928.3 dated Nov. 16, 2017.

Jacobsen et al., Advanced Materials (2007), 19, pp. 3892-3896, "Micro-Scale Truss Structures Formed From Self-Propagating Photopolymer Waveguides" dated 2007.

Communication Pursuant to Article 94(3) EPC dated Oct. 12, 2020 for EP Application No. 17177928.3.

Russian Office Action for Application No. 2017122053/05 dated Jul. 29, 2020.

Notice of Reasons for Rejection for JP Application No. 2017-132418 dated Apr. 6, 2021.

* cited by examiner

SYSTEM AND METHOD FOR MAKING PIN REINFORCED SANDWICH PANEL AND RESULTING PANEL STRUCTURE

FIELD

This invention relates to the fabrication of a micro-truss structure and more particularly to a micro-truss structure constructed with use of polymerizing a photo-monomer resin.

BACKGROUND

Micro-truss structures are formed from projecting a collimated light beam from a source through a mask into a photo-monomer resin material. The light beam enters the photo-monomer resin material through an opening in the mask and forms a polymerized photo-monomer resin structure along the light beam within the photo-monomer resin material. This process forms a core which will be assembled into a micro-truss structure. The core is then removed from the photo-monomer resin material. In the instance of fabricating a sandwiched structure, the core is then bonded to opposing face sheet structures one at a time. One face sheet is bonded to one side of the core with the core in a face down orientation to prevent adhesive mixture from entering into the sandwiched structure. A second face sheet is then bonded to a second opposing side of the core forming the sandwich configuration.

The separate steps of forming the core and thereafter bonding each face sheet structure separately to the core results in a time consuming multi-step process and is costly. In optimizing the fabrication of the micro-truss structure, the step of fully curing the polymerization of the photo-monomer resin is completed before the next step of bonding the micro-truss core to one or more face sheet structures is commenced. This fabrication process as a result involves successive curing times for optimum results in fabrication.

SUMMARY

An embodiment provides a system for forming a structural member which includes a first collimated light source and a reservoir containing a volume of photo-monomer resin wherein the first collimated light source is positioned spaced apart from the photo-monomer resin. The system further includes a first face sheet structure defining at least one bore which extends through the first face sheet structure wherein a portion of the first face sheet structure is positioned under a surface of the volume of photo-monomer resin such that photo-monomer resin is positioned within the bore.

An embodiment provides a structural member which includes a first face sheet structure defining at least one bore which extends through the first face sheet structure. The structural member further includes a polymerized structure formed from a photo-monomer resin, wherein a portion of the polymerized structure is secured to the first face sheet structure and positioned within the at least one bore and another portion of the polymerized structure extends in a direction away from the first face sheet structure.

The features, functions, and advantages that have been discussed can be achieved independently in various embodiments or may be combined in yet other embodiments further details of which can be seen with reference to the following description and drawings.

DETAILED DESCRIPTION

Figure 1:
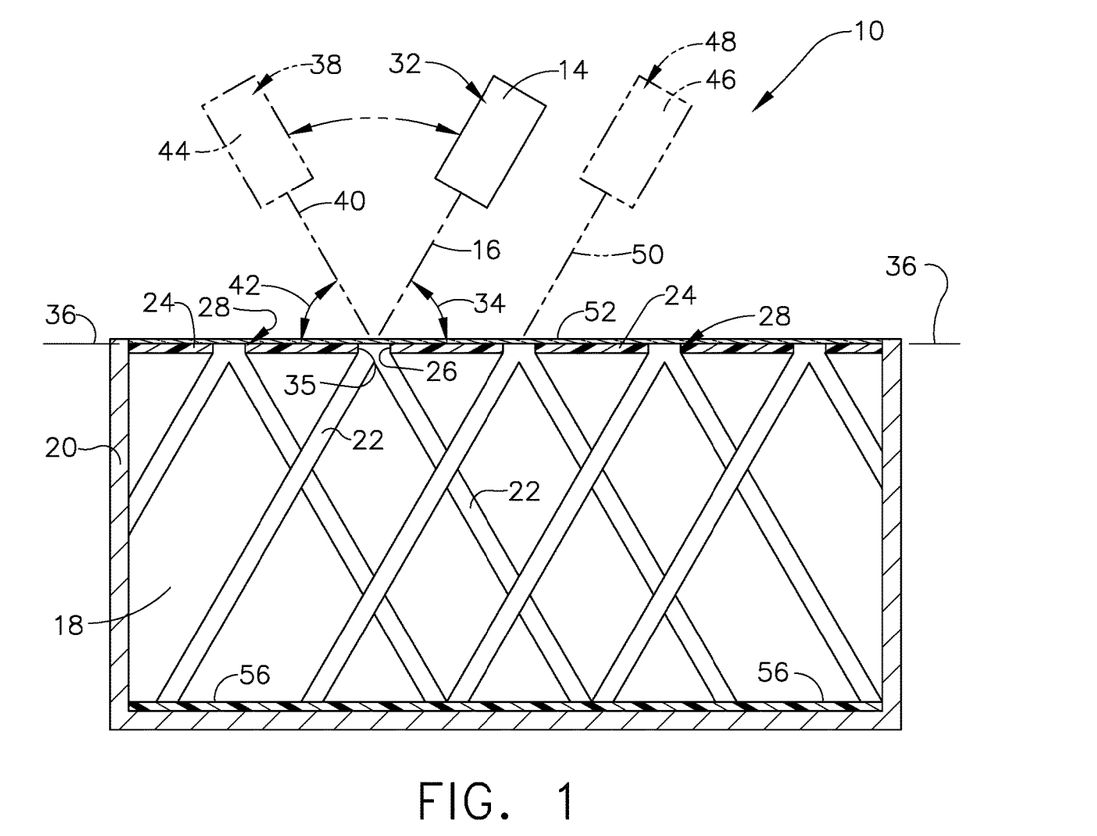
FIG. 1 is a schematic cross section view of a system for making a micro-truss structural member.
Figure 2:
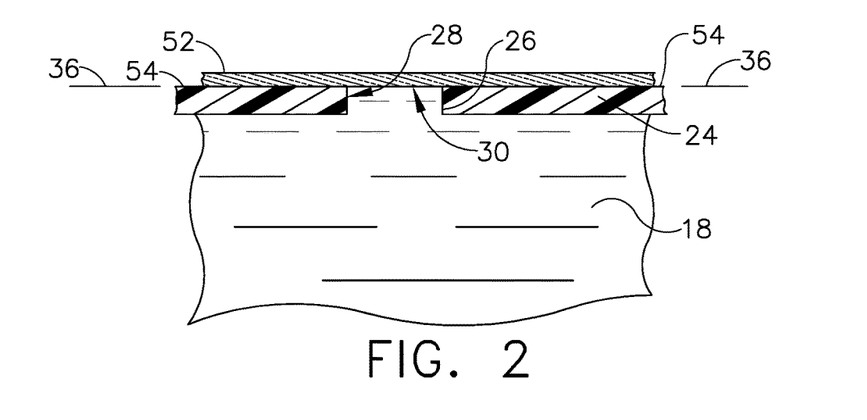
FIG. 2 is a partial enlarged view of the system of FIG. 1 without a light beam from a collimated light emitting source forming a structure by way of polymerizing along the light beam the photo-monomer resin contained within the reservoir.
Figure 3:
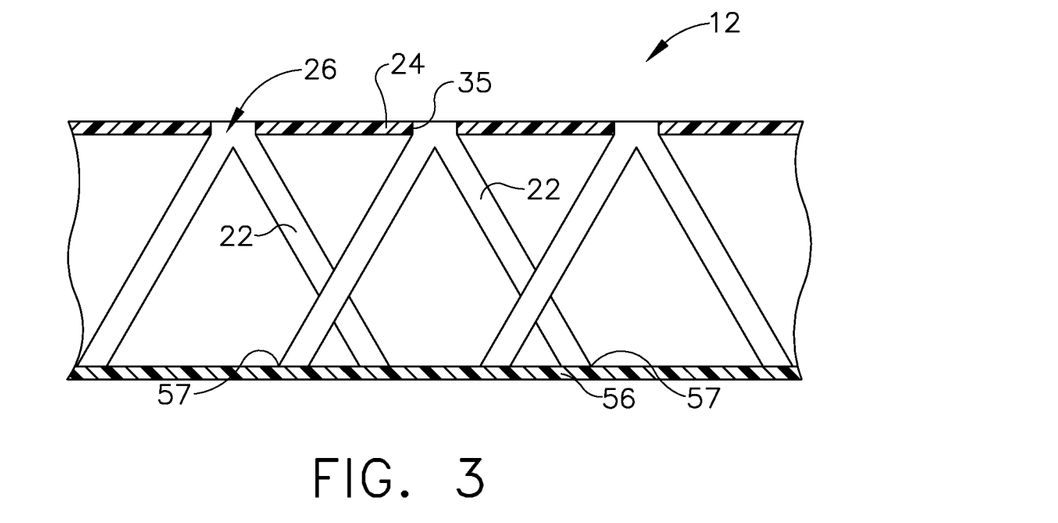
FIG. 3 is a schematic view of a cross section of a micro-truss structural member fabricated from the system shown in FIG. 1.

In referring to FIGS. 1 and 2, system 10 is shown for forming a micro-truss structural member such as for example is shown in FIG. 3 as micro-truss structural member 12. Structural member 12 and other variations or embodiments of this structural member, as will be described herein, provide desirable structural performance characteristics such as being lightweight, providing stiffness and having a high strength to density ratio. In addition, these structures provide improved vibration and acoustic dampening performance, as well as, provide reasonable manufacturing times. Additionally, various shaped embodiments of structural member 12 can be fabricated to provide desired configurations such as having a converging thickness or having a curved external surface if needed. With the micro-truss structural member 12 having desirable structural characteristics and performances as well as being able to be fabricated in a wide range of configuration, these micro-truss structures are applicable for use in aircraft fabrication as well as in other fabrication applications where such structural characteristics and performances are needed.

In referring to FIGS. 1 and 2, as mentioned above, system 10 for forming a first embodiment of micro-truss structural member 12 is shown. System 10 includes first collimated light source 14 which includes one of a variety of light sources such as in this example a light emitting diode (LED) which emits an ultraviolet (UV) beam. The light beam is collimated within first collimated light source 14 resulting in a collimated first light beam 16 being emitted from collimated light source 14. First light beam 16 is selected so as to effectively promote and propagate polymerization of a photo-monomer resin 18 contained in reservoir 20 with first light beam 16 penetrating photo-monomer resin 18. As seen in FIG. 1, first collimated light source 14 is positioned spaced apart from photo-monomer resin 18. As will be discussed herein, first collimated light source 14 can be a singular collimated light source which would be moved to different locations relative to reservoir 20 so as to emit a light beam in different directions into the photo-monomer resin to form various polymerized photo-monomer structures 22 as desired. Alternatively, a number of collimated light sources can be provided positioned in different locations relative to reservoir 20 so as not to have to move a single first collimated light source 14 into different locations in fabricating a number of different polymerized photo-monomer structures 22 for micro-truss structural member 12, which will be described in more detail below.

System 10 further includes first face sheet structure 24 which defines at least one bore 26 which extends through first face sheet structure 24. As seen in FIG. 1, a plurality of bores 26 are defined in first face sheet structure 24 and can be selectively positioned along a length and a width of the sheet. Any number of bores 26 can be utilized and positioned in various desired arrangements in first face sheet structure 24. Bores 26 can be positioned in first face sheet 24 so as to accommodate a desired performance for structural member 12 with positioning the location and number of polymerized photo-monomer structures 22 to be incorporated into structural member 12. Wide variety of sizes and shapes for bores 26 may be employed which can be selected from various regular and irregular shapes. A dimension across at least one bore 26 includes a wide range dimensions such as to include ten (10) microns up to and including ten (10) millimeters. As will be discussed herein, first face sheet structure 24 will become part of structural member 12 wherein first face sheet structure 24 is not transparent to an ultraviolet (UV) light source and is constructed of one of a metal, polymer, composite material and other suitable material needed for the structural performance of structural member 12.

A portion of first face sheet structure 24, as seen in FIG. 2, is positioned under a surface 30 of volume of photo-monomer resin 18 within reservoir 20 such that photo-monomer resin 18 is positioned within bore 26. With photo-monomer resin 18 positioned within bore 26, as first light beam 16 passes into bore 26 first light beam 16 promotes polymerization of photo-monomer 18 within bore 26 such that polymerized photo-monomer structure 22 is positioned within bore 26 and is bonded and secured to sidewall 35 within bore 26 of first face sheet structure 24. As first light beam 16 passes from within bore 26 into the photo-monomer resin 18 positioned in reservoir 20 below first face sheet structure 24, the polymerization of resin 18 propagates through resin 18 along first light beam 16 forming polymerized photo-monomer structure 22 extending along first light beam 16 and away from first face sheet structure 14 and bore 26.

As mentioned above, first collimated light source 14 is positioned spaced apart from photo-monomer resin 18, as seen in FIG. 1. First collimated light source 14 is position in a first location 32 relative to reservoir 20 such that first light beam 16 emitted from the first collimated light source 14 enters the at least one bore 26 and forms a first angle 34 with plane 36 of surface 30 of the photo-monomer resin 18. The propagation of polymerization of the photo-monomer resin 18 occurs within reservoir 20 along the line of first light beam 16 forming a polymerized photo-monomer structure 22. The operator of system 10 will look at the dimension of bore 26, thickness of first face sheet structure 24 and angle 34 of first light beam 16 to assure first light beam 16 is not undesirably blocked by sidewall 35 within bore 26. Blocking of beam 16 can reduce the desired amount of polymerization of photo-monomer resin 18 resulting in either an absence of or an underdevelopment of polymerized photo-monomer structure 22.

In one example of system 10, first collimated light source 14 is moveable from first location 32 to a second location 38 (shown in phantom), as seen in FIG. 1, relative to reservoir 20. Second light beam 40 emitted from the second location 38 enters the at least one bore 26 and forms a second angle 42 with plane 36 of the surface 30 of the photo-monomer resin 18. This approach can be applied such that a single collimated light source can be used to form multiple polymerized photo-monomer structures 22 which will extend from one bore 26. Alternatively, single collimated light source can be used to form multiple polymerized photo-monomer structures 22 for all of bores 26 in first face sheet structure 24 as seen for example by third location 48. In this example, first collimated light source 14 would be moved to multiple locations for each bore 26.

In another example, system 10 further includes a second collimated light source 44 which would be positioned at second location 38 shown in phantom relative to the reservoir 20 such that second light beam 40 emitted from the second collimated light source 44 enters the at least one bore 26 and forms second angle 42 with plane 36 of the surface 30 of photo-monomer resin 18. Thus, as seen for example with second collimated light source 44 multiple collimated light sources could be positioned at a single particular bore 26 so as to create multiple polymerized photo-monomer structures 22 associated with that particular bore 26. Moreover, this arrangement of collimated light sources can be utilized at other bores 26 as seen for example, a third collimated light source 46 which emits third light beam 50 is shown in phantom at third location 48 which is associated with another bore 26 positioned spaced apart from bore 26 which was associated with first collimated light source 14. As a result, alternative examples of system 10, can employ multiple collimated light sources with each particular bore 26 so as form a desired number and angularly positioned polymerized photo-monomer structures 22 associated with that particular bore 26.

System 10 further includes an ultraviolet (UV) transparent sheet 52 positioned between first collimated light source 14 and first face sheet structure 24. Ultraviolet (UV) transparent sheet 52 is positioned overlying first face sheet structure 24 and, in this example, all bores 26 defined in first face sheet structure 24. Transparent sheet 52 is positioned into a blocking position, as seen in FIG. 2, with respect to photo-monomer resin 18 positioned within bore 26. With sheet 52 overlying bore 26, sheet 52 blocks resin 18 from moving onto a top surface 54 of first face sheet structure 24 and preventing resin 18 from entering between sheet 52 and first face sheet structure 24 and thereby causing undesired securement between sheet 52 and first face sheet structure 24. In many instances, once micro-truss structure 12 is completed and removed from reservoir 20, transparent sheet 52 is removed from first face sheet structure 24. The ultraviolet (UV) transparent sheet is constructed from one of a variety of suitable transparent materials such as glass, acrylic, polyvinyl chloride, polypropylene and polyethylene terephthalate material.

System 10 further includes a second face sheet structure 56 positioned within reservoir 20. This will be the case where the operator of system 10 wants a second panel in micro-truss structural member 12. In that case, second face sheet structure 56 is positioned submerged in photo-monomer resin 18, as seen in FIG. 1. With light beam 16 passing through bore 26 polymerization of resin 18 takes place resulting in the formation of structure 22. The formation of structure 22 propagates through resin 18 along light beam 16 and structure 22 bonds to second face sheet structure 56 where light beam 16 strikes second face sheet structure 56. In this set up, the polymerized photo-monomer structure 22 forms a chemical bond with sidewall 35 within bore 26. In some embodiments, sidewall 35 of bore 26 as well as the surface of first face sheet structure 24 in contact with resin 18 will be scratched, etched or sanded (not shown) to roughen sidewall 35 and the surface of first face sheet structure 24. Roughening of sidewall 35 and the surface of first face sheet structure 24 that is in contact with resin 18 will enhance bonding of structure 22 to sidewall 35 and the surface of first face sheet structure that would be in contact with resin 18 when the photo-monomer resin 18 is polymerized with light beam 16. With structure 22 secured within bore 26, a further mechanical engagement of structure 22 first face sheet structure 24 is also provided. In the same process, structure 22 bonds to second face sheet structure 56 with the polymerization of resin 18 with light beam 16. Again, in some embodiments the surface of face sheet structure 56 that bonds to structure 22 will be scratched, etched or sanded to enhance the bonding engagement with structure 22. An example of the result of employing system 10 is the formation of micro-truss structural member 12 as seen in FIG. 3. Structural members 22 are formed, structural members 22 are bonded to and mechanically engaged to first face sheet structure 24 and structural members 22 are bonded to second face sheet structure 56 all in one process.

Figure 4:
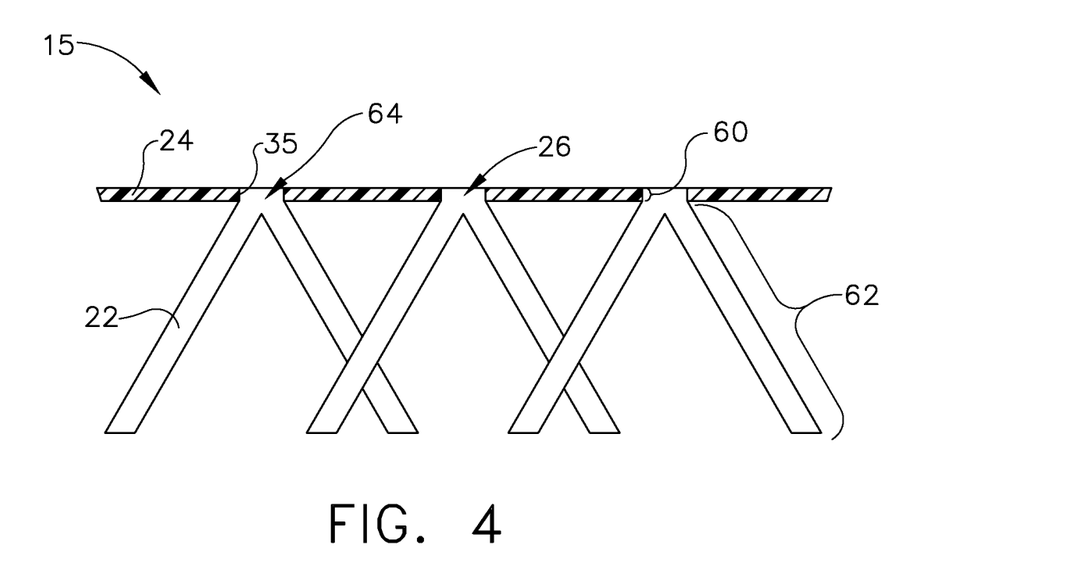
FIG. 4 is a schematic view of a cross section of a second embodiment of the micro-truss structural member of FIG. 3 wherein the structural member is absent a second face sheet structure.

As mentioned earlier a variety of differently configured micro-truss structures can be fabricated from system 10. Such structural members will include, for example as seen in FIG. 4, a first face sheet member 24 defining at least one bore 26 which extends through first face sheet structure 24. The structure will also include a polymerized structure 22 formed from a photo-monomer resin. Structure 22 includes a portion 60 of structure 22 positioned within bore 26 and secured to a first face sheet structure 24. As described above, resin 18 bonds to interior sidewall 35 of bore 26. In some embodiments, as mentioned above, sidewall 35 of bore 26 as well as the surface of first face sheet structure 24 in contact with resin 18 will be scratched, etched or sanded (not shown) to roughen sidewall 35 and the surface of first face sheet structure 24. Roughening of sidewall 35 and the surface of first face sheet structure 24 that is in contact with resin 18 will enhance the bonding securement of structure 22 to sidewall 35 and the surface of first face sheet structure 24 that contacts resin 18 when the photo-monomer resin 18 is polymerized with light beam 16. The positioning of portion 60 of structure 22 within bore 26 also provides an additional mechanical engagement of structure 22 to first face sheet structure 22. Another portion 62 of structure 22, as seen in FIG. 4, extends in a direction away from first face sheet structure 24.

A first embodiment of micro-truss structure 12 is shown in FIG. 3 which includes the above described structure and includes polymerized structure 22 bonded at the distal end 57 of polymerized structure 22 to second face sheet structure 56. In this example second face sheet structure 56 is oriented in parallel relationship with respect to first face sheet structure 24. This embodiment was fabricated with use of system 10, as shown in FIG. 1. As mentioned above, structural member 12 is fabricated in a single process with structures 22 formed, structures 22 are bonded to sidewall 35 within bore 26 of first face sheet structure 24, structures 22 are mechanically engaged within bore 26 and distal ends 57 of structures 22 are bonded to second face sheet structure 56. As mentioned above, second face sheet structure 56 is also scratched, etched or sanded so as to enhance the securement of structures 22 to second face sheet structure 56.

A second embodiment of micro-truss structure 15 is shown in FIG. 4. This micro-truss structural member 15 is fabricated with first face sheet structure 24 and polymerized photo-monomer structures 22, as discussed above. This second embodiment 15 does not include a second face sheet structure and therefore one is not provided within reservoir 20 in system 10 at the time of fabricating this second embodiment of micro-truss structure 15. In fabricating this second embodiment 15 with system 10, polymerized structures 22 are formed; polymerized structures 22 are bonded to sidewall 35 within bore 26 of first face sheet structure 24; and polymerized structures 22 are mechanically engaged within bore 26 all in the same process.

Figure 5:
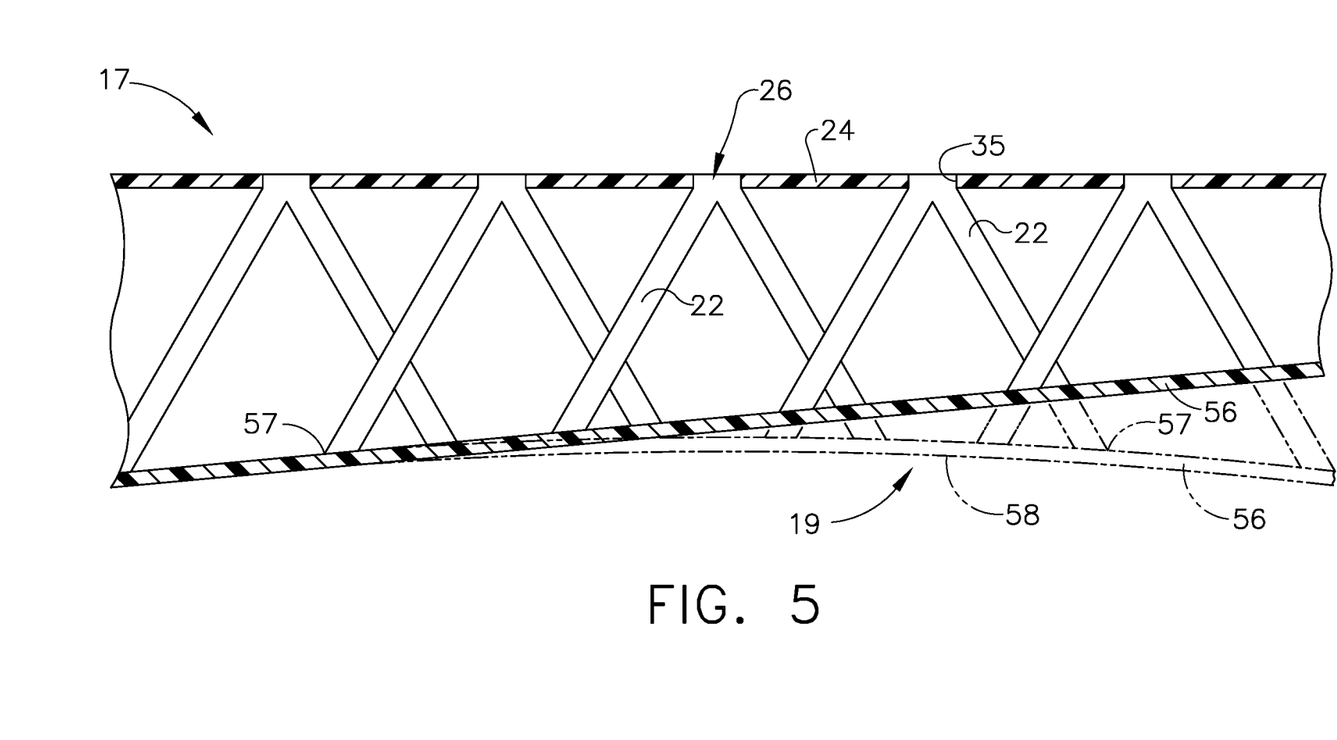
FIG. 5 is a schematic view of a cross section of a third embodiment of a micro-truss structure wherein an angled second face sheet structure in relationship to the first face sheet structure is shown and a fourth embodiment is shown in phantom wherein the second face sheet structure has a curved surface.

A third embodiment of a micro-truss structure 17 is shown in FIG. 5. In this embodiment, second face sheet structure 56 is bonded to distal end 57 of polymerized structure 22 wherein second face sheet structure 56 is positioned in an angular orientation relative to first face sheet structure 24. This configuration provides a gradual reduction in thickness of the micro-truss structure. This embodiment, as the other embodiments, is assembled in a single process with system 10. Second face sheet structure 56 is positioned in an angular orientation within reservoir 20 relative to first face sheet structure 24 at the time system 10 is implemented to fabricate this embodiment of the micro-truss structure. Again, polymerized structures 22 are formed, polymerized structures 22 are bonded to sidewall 35 within bore 26 of first face sheet structure 24, polymerized structures 22 are mechanically positioned within bore 26 and polymerized structures 22 are bonded at distal end 57 of polymerized structures 22 to second face sheet structure 56 all in the same process.

Also shown in FIG. 5, is a fourth embodiment of the micro-truss structure 19. In this embodiment second face sheet structure 56 comprises curved surface 58 and second face sheet structure 56 is bonded to distal end 57 of polymerized structure 22. This configuration provides the micro-truss structural member with a desired external curved surface 58. As described above, this embodiment was also fabricated in a single step process with system 10 as described above with second face sheet structure 56 with curved surface 58 is bonded to distal end 57 of polymerized structure 22. System 10 includes second face sheet structure 56 having curved surface 58 being positioned within reservoir 20 at the time of implementing system 10 to fabricate this fourth embodiment 19.

Figure 6:
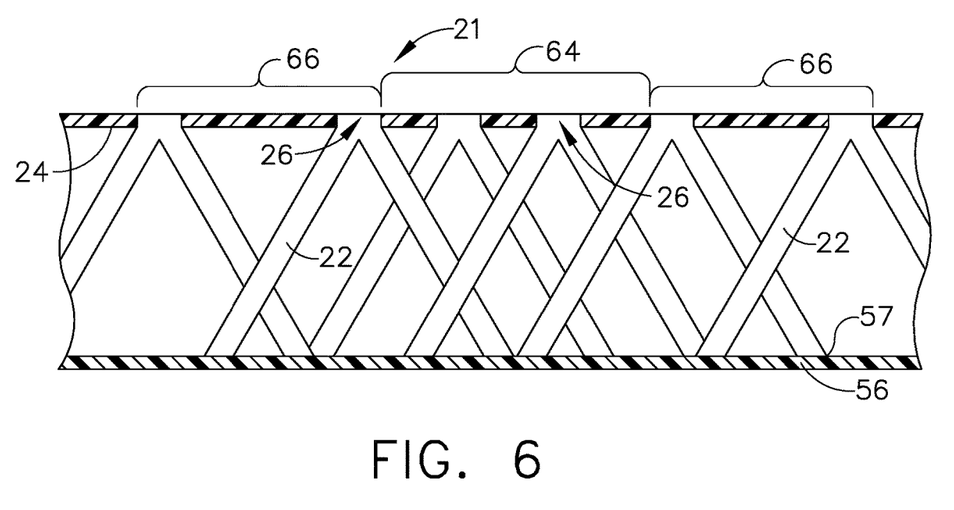
FIG. 6 is a schematic view of a cross section of a fifth embodiment of the structural member of FIG. 3.

As mentioned above, first face sheet structure 24 defines a plurality of bores 26. The position of the plurality of bores 26 within first face sheet structure 24 provides for the location from which structures 22 originate and extend to and bond to a second face sheet structure 56, should one be required, in forming a micro-truss structure. In some embodiments, it may be desired to have a higher density of structures 22 positioned in particular locations in the micro-truss structural member relative to other locations within the micro-truss structural member. A fifth embodiment of a micro-truss structure 21 is shown in FIG. 6. In this embodiment first face sheet structure 24 defines a plurality of bores 26 each of which contain a portion 60, as seen for example in FIG. 4, of a polymerized structure 22 formed from the photo-monomer resin 18. A first portion 64 of the plurality of bores 26 include adjacent bores 26 positioned closer to one another than adjacent bores positioned within second portion 66 of the plurality of bores 26. In a sheet configuration for first face sheet structure 24, first portion 64 of plurality of bores 26 from which structures 22 extend can be surrounded by second portion 66 of plurality of bores 26 from which structures 22 extend. In this example, a higher density of structures 22 can be positioned in desired locales as needed in fabricating a micro-truss structure so as to accommodate conditions the micro-truss structure will be required to confront.

Figure 7:
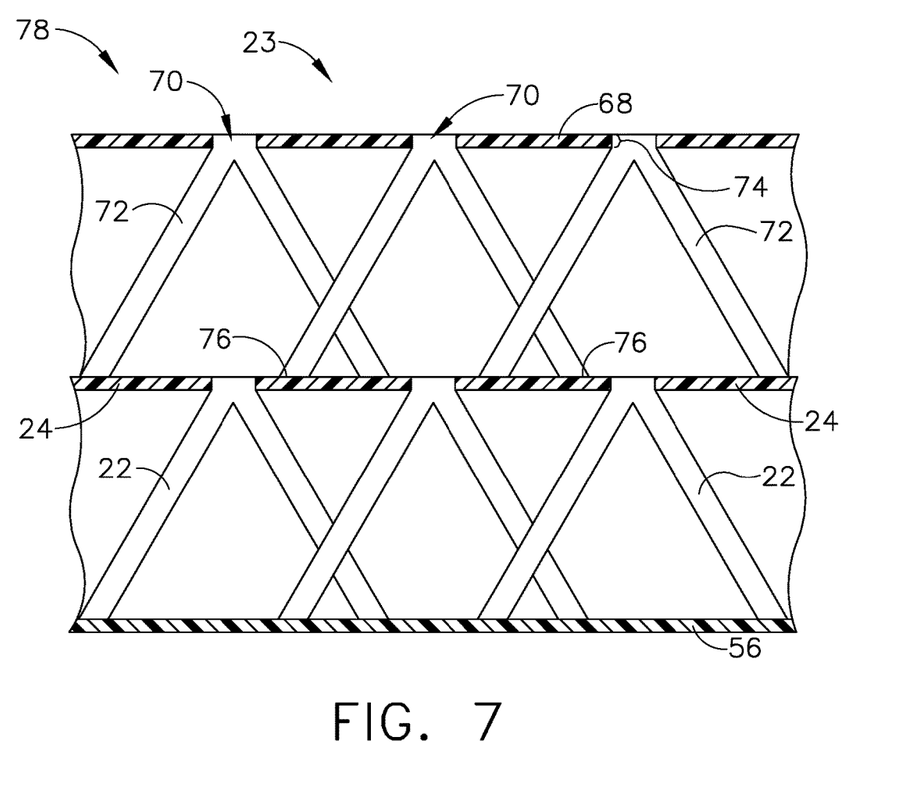
FIG. 7 is a schematic view of a cross section of a sixth embodiment of the structural member which includes a stacked arrangement.

A sixth embodiment of a micro-truss structure 23 is shown in FIG. 7. This structure includes a third face sheet structure 68 defining at least one of a second bore 70 which extends through third face sheet structure 70. This micro-truss structure also includes a second polymerized structure 72 formed from photo-monomer resin 18 wherein a portion 74 of the structure is positioned within the at least one of the second bore 70 of the third face sheet structure and extends away from the third face sheet structure 70. Distal end 76 of second polymerized structure 72 is bonded to the first face sheet structure 24. The third face sheet structure 68 along with second polymerized structure 72 are formed from system 10 as described above for the second embodiment shown in FIG. 4. The micro-truss structure shown in FIG. 7, which comprises first face sheet structure 24, polymerized structures 22 and second face sheet structure 56 is fabricated with system 10 and is fabricated the same as described herein and shown in FIG. 3. In this example, with the micro-truss structures separately fabricated as seen in FIGS. 3 and 4, distal ends 76 of second polymerized structures 72 are thereafter bonded to first face sheet structure 24 creating a stacked micro-truss structure 78, as seen in FIG. 7.

While various embodiments have been described above, this disclosure is not intended to be limited thereto. Variations can be made to the disclosed embodiments that are still within the scope of the appended claims.

What is claimed:

1. A system for forming a structural member, comprising:
    a first collimated light source;
    a reservoir containing a volume of photo-monomer resin wherein the first collimated light source is positioned spaced apart from and positioned above the photo-monomer resin; and
    a first face sheet structure has a top surface, which faces the first collimated light source, wherein:
        the first face sheet structure defines at least one bore, which extends through the first face sheet structure;
        a portion of the first face sheet structure is positioned under a surface of the volume of photo-monomer resin such that photo-monomer resin is positioned within the at least one bore with a removable transparent sheet positioned overlying the top surface of the first face sheet and the at least one bore such that the removable transparent sheet blocks the photo-monomer resin from being positioned on the top surface of the first face sheet;
        with collimated light emitted from the first collimated light source into the photo-monomer resin positioned within the at least one bore, an end of a polymerized structure is positioned within the at least one bore without the end of the polymerized structure positioned beyond the top surface of the first face sheet structure;
        a portion of the polymerized structure is secured to the first face sheet structure within the at least one bore; and
        another portion of the polymerized structure extends outside of the at least one bore in a direction away from the first face sheet structure through the volume of the photo-monomer resin; and
    a second face sheet structure positioned within the reservoir, wherein the another portion of the polymerized structure extends to the second face sheet with a distal end of the another portion of the polymerized structure and is bonded to a surface of the second face sheet.

2. The system of claim 1, further including the first collimated light source positioned in a first location relative to the reservoir such that a collimated first light beam emitted from the first collimated light source enters the at least one bore and forms a first angle with a plane of the surface of the photo-monomer resin.

3. The system of claim 2, further including the first collimated light source is moveable to a second location relative to the reservoir such that a second collimated light beam emitted from the first collimated light source in the second location enters the at least one bore and forms a second angle with a plane of the surface of the photo-monomer resin.

4. The system of claim 2, further including a second collimated light source positioned in a second location relative to the reservoir such that a second light beam emitted from the second collimated light source enters the at least one bore and forms a second angle with a plane of the surface of the photo-monomer resin.

5. The system of claim 1, wherein the first face sheet structure is not transparent to an ultraviolet (UV) light source.

6. The system of claim 1, wherein the ultraviolet (UV) transparent sheet is positioned overlying the first face sheet structure and the at least one bore in a blocking position with respect to the photo-monomer resin positioned within the at least one bore.

7. The system of claim 6, wherein the ultraviolet (UV) transparent sheet is constructed of one of glass, acrylic, polyvinyl chloride, polypropylene and polyethylene terephthalate material.

8. The system of claim 1, further including a second face sheet structure positioned within the reservoir.

9. The system of claim 8, wherein the second face sheet structure is positioned in one of a parallel or angular orientation relative to the first face sheet structure.

10. The system of claim 8, wherein the second face sheet structure defines a curved surface.

11. The system of claim 1, further including a plurality of bores defined in the first face sheet structure.

12. The system of claim 11, wherein the plurality of bores include a first portion of bores wherein adjacent bores within the first portion of bores are positioned closer to one another than adjacent bores positioned within a second portion of the plurality of bores.

13. The system of claim 12, wherein the first portion of the plurality of bores defined in the first face sheet structure are surrounded by the second portion of the plurality of bores.

14. A micro-truss structural member, comprising:
    a first face sheet structure defining at least one bore which extends through the first face sheet structure, wherein the first face sheet has a top surface;
    a polymerized structure formed from a photo-monomer resin positioned within the at least one bore as a result of a collimated light having been emitted into the at least one bore from a first collimated light source positioned above the photo-monomer resin wherein:
        a removable transparent sheet is positioned overlying the top surface of the first face sheet structure and the at least one bore, such that the removable transparent sheet blocks the photo-monomer resin from being positioned on the top of the surface of the first face sheet structure with a portion of the first face sheet structure positioned under a surface of a volume of the photo-monomer resin, such that the photo-monomer resin is positioned within the at least one bore; and an end of the polymerized structure is formed and positioned within the at least one bore without the end of the polymerized structure positioned beyond the top surface of the first face sheet;

a portion of the polymerized structure is secured to the first face sheet structure within the at least one bore; and another portion of the polymerized structure extends outside of the at least one bore in a direction away from the first face sheet structure; and a second face sheet structure, wherein the another portion of the polymerized structure extends to the second face sheet with a distal end of the polymerized structure bonded to a surface of the second face sheet.

15. The micro-truss structural member of claim 14, wherein a surface of the at least one bore comprises a scratched surface.

16. The micro-truss structural member of claim 14, wherein the second face sheet structure is positioned in one of a parallel and an angular orientation relative to the first face sheet structure.

17. The micro-truss structural member of claim 14, wherein the second face sheet structure comprises a curved surface.

18. The micro-truss structural member of claim 14, further including the first face sheet defining a plurality of bores each of which contain a portion of a polymerized structure formed from the photo-monomer resin, wherein a first portion of the plurality of bores include adjacent bores positioned closer to one another than adjacent bores positioned within a second portion of the plurality of bores.

19. The micro-truss structural member of claim 14, further including:

a third face sheet structure defining at least one of a second bore which extends through the third face sheet structure; and a polymerized structure formed from photo-monomer resin, wherein:

a portion of the polymerized structure is positioned within the at least one of the second bore of the third face sheet structure and extends away from the third face sheet structure; and a distal end of the polymerized structure is bonded to the first face sheet structure.

20. The micro-truss structural member of claim 14, wherein the first face sheet is constructed of one of a metal, polymer or composite material.

* * * * *